United States Patent [19]

Virdee

[11] Patent Number: 4,570,036
[45] Date of Patent: Feb. 11, 1986

[54] DIGITAL DUPLEX COMMUNICATION SYSTEM

[75] Inventor: Nirmal S. Virdee, Reigate, England

[73] Assignee: U.S. Philips Corporation, New York, N.Y.

[21] Appl. No.: 504,548

[22] Filed: Jun. 15, 1983

[30] Foreign Application Priority Data

Jun. 25, 1982 [GB] United Kingdom ............... 8218479

[51] Int. Cl.$^4$ ............................................. H04L 7/04
[52] U.S. Cl. ................................................. 179/170.2
[58] Field of Search ............... 179/170.2, 170.6, 170.8; 370/32; 364/721

[56] References Cited

FOREIGN PATENT DOCUMENTS 2048016 12/1980 United Kingdom .
2110020 6/1983 United Kingdom .

*Primary Examiner*—James L. Dwyer
*Attorney, Agent, or Firm*—Jack E. Haken; James J. Cannon, Jr.

[57] ABSTRACT

A digital duplex communication system for data signals having a power-versus-frequency spectrum having two side bands located one each side of a symbol frequency, the system comprising a transmitter/receiver which includes an echo canceller. The received signal is sampled at a multiple of the bit rate and has in each symbol period a first time during which data is valid (true eye) and a second time during which data is invalid (false eye). The receiver includes circuitry to decode the data from the sampled signal during the true eye. The echo canceller is designed to be operative only during the sampling instant in the true eye and at one of the zero crossing instants in each bit period. Thus the echo canceller is operative at the instants $t_1$ and $t_2$ but not at the instants $t_3$ and $t_4$ when no information is being extracted from the received signal. This enables the storage capacity of a look-up table type echo canceller to be reduced and the processing speed of a transversal filter type echo canceller to be reduced.

4 Claims, 6 Drawing Figures

DIGITAL DUPLEX COMMUNICATION SYSTEM

BACKGROUND OF THE INVENTION

1. Field of the Invention

The invention relates to a digital duplex communication system for data signals having a power-versus-frequency spectrum comprising two side bands located one each side of a symbol frequency, the system comprising a transmitter/receiver including an echo canceller, the received signal being sampled at a multiple of the bit rate and comprising in each symbol period a first time during which data is valid and a second time during which data is invalid, the data being decoded from the value of the sampled signal during the first time.

2. Description of the Prior Art

Such a system is described in U.S. Pat. No. 436,533, filed 10-25-82 in which the received signal, which is encoded according to the WAL2 code, is sampled at four times the bit rate and the echo canceller produces an echo replica at each sampling instant which replica is subtracted from the received signal. The received signal produces an eye diagram having a true eye which corresponds to the first time during which data is valid and a false eye which corresponds to the second time during which the data is invalid. An ambiguity detector such as that disclosed in U.K. Patent Application No. 2048016A is included in the receiver to detect which is the true eye so that the data may be extracted from the true eye only.

In the system described in the first aforementioned patent application the echo canceller has to produce echo replica signals at four times the bit rate thus increasing the speed at which a transversal filter type canceller has to operate or increasing the storage capacity needed in a look-up table type canceller.

SUMMARY OF THE INVENTION

It is an object of the invention to provide a system in which the speed requirements of a transversal filter type echo canceller or the storage requirements of a look-up table type echo canceller are reduced.

The invention provides a digital duplex communication system as described in the opening paragraph characterized in that the echo canceller is inoperative when the received signal is sampled during the second time.

Since the signal during the false eye is not used to detect the data received it is unnecessary to correct the signal during the false eye. In theory it is only necessary to correct the received signal at the sampling instant which coincides with the center of the true eye but in practice it may be necessary to correct the signal at other instants in order to detect zero crossings to enable clock extraction. If however clocking information can be derived other than from the received signal it would then be possible to correct the received signal only at the center of the true eye. In that case the required storage capacity of a look-up table type echo canceller may be reduced by 75% and the required operating speed of a transversal filter type echo canceller may be similarly reduced.

A system in which the received signal is sampled four times in each symbol period, the third time corresponding to a zero crossing of the signal between the first and second times and the fourth time corresponding to a zero crossing of the signal between the second time of one symbol period and the first time of the succeeding symbol period, may be characterized in that the echo canceller is inoperative at the second and fourth times.

This will enable zero crossing information to be extracted from the received signal so that the receiver clock can be derived from the received signal yet still enable a 50% reduction in the required storage capacity of the look-up table or in the processing speed requirements of a transversal filter type echo canceller.

BRIEF DESCRIPTION OF THE DRAWINGS

An embodiment of the invention will now be described, by way of example with reference to the accompanying drawings, in which.

DESCRIPTION OF THE PREFERRED EMBODIMENT

Figure 1:
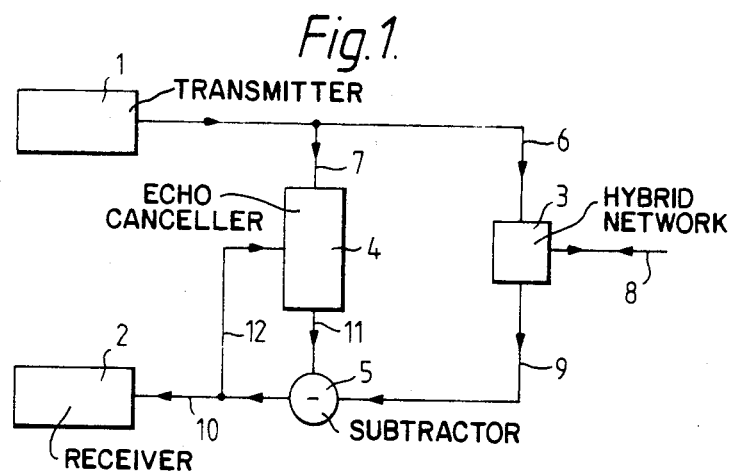
FIG. 1 shows in block schematic form a transmitter/receiver for use in a communication system according to the invention.

FIG. 1 shows a transmitter/receiver for use in a communication system which comprises a transmitter 1, a receiver 2, a hybrid network 3, an echo canceller 4, and a subtractor 5. The signal to be transmitted is fed from the transmitter 1 via a path 6 to the hybrid network 3 and via a path 7 to a first input of the echo canceller 4. The hybrid network 3 causes the signal to be transmitted to be coupled to a transmission path 8 while minimizing the magnitude of the transmitted signal fed to the receiver 2. Hybrid networks however do not provide sufficient isolation between the transmitter 1 and receiver 2 to enable reliable duplex data transmission to be achieved. In order to reduce still further the proportion of the signal to be transmitted which is fed back to the input of the receiver 2, the echo canceller 4 is connected across the analog hybrid network 3 to increase the isolation between the transmitter and the receiver to an acceptable level. It does this by testing for correlation between the transmitted and the received signals and producing an output, the echo replica, which when subtracted from the received signal minimizes this correlation. The signal to be transmitted is fed to the echo canceller 4 via a line 7 while the received signal is fed to a first input of the subtractor 5 via a line 9. The output from the echo canceller 4 is fed to a second input of the subtractor 5 via a line 11. The subtractor 5 subtracts the signal produced by the echo canceller 5 from the received signal and its output is fed to the receiver 2 via a line 10 and to the echo canceller 4 via a line 12.

The echo itself can be divided into two parts: near-end echo and distant or line echo. The near-end echo is due to the direct leakage of the transmitted signal into the receiver because of the poorly balanced hybrid network, and the line-echo is due to impedance discontinuities in the two-wire circuit. The distant echo is normally much smaller in magnitude than the former and its main significance is its delayed arrival. The level of the near-end echo can be as great as −10 dB, relative to the transmitted signal level, so that on long connections when the level of the received far-end signal can be −40 dB relative to the transmitted signal level, the interfering echo signal can be 30 dB stronger than the wanted signal. If it is assumed that a 30% closure of the eye is tolerable for a 2-level digital system, the wanted signal must be 10 dB stronger then the interfering signals. On this basis, and with some allowance for the line echo, an echo-canceller capable of providing between 40 to 50 dB echo suppression is desirable.

The maximum echo length with which the canceller will be required to cope is determined by the line echoes. Hence the maximum possible echo length is the round trip time for the signal for the longest line connection. However, not all line echoes need to be cancelled. For instance, the reflections from the far-end equipment on long connections do not need to be considered since these will have been attenuated by more than twice as much as the wanted signal and are therefore unlikely to cause any problem. A simple criterion which may be used to determine the 'significant echo length' is that the line echoes arriving at the receiver which are more than 10 dB below the wanted signal level may be ignored. To proceed further with this argument the length of the longest connection needs to be known.

If it is assumed that the system is designed to allow subscribers within 5 km of their local exchange to be reached at 96 kbit/s using the WAL 2 code and that at a frequency of 96 kHz the line attenuation is approximately 8 dB/km then only echoes from the first 2.8 km need be considered as significant even with a reflection coefficient as high as 0.5. At lower frequencies the line attenuation is lower and the significant echo length longer. However, with a code such as WAL 2 the energy at low frequencies is very small. An echo length of about 30 μs corresponding to a 3 km line length is therefore considered to be sufficient for the system as described.

The convergence time is the time it takes the echo-canceller to produce a sufficiently accurate echo replica. It depends on various factors which include adaption algorithm used, degree of echo suppression required, maximum length of echoes expected, correlation between the digital signals transmitted from the two ends and the rate of transmission. In general, a convergence time of less than a second is normally acceptable. Even after the convergence time the echo-canceller should continue to adapt so as to respond to slow changes in the line characteristics due to, for example, temperature variations.

Figure 4:
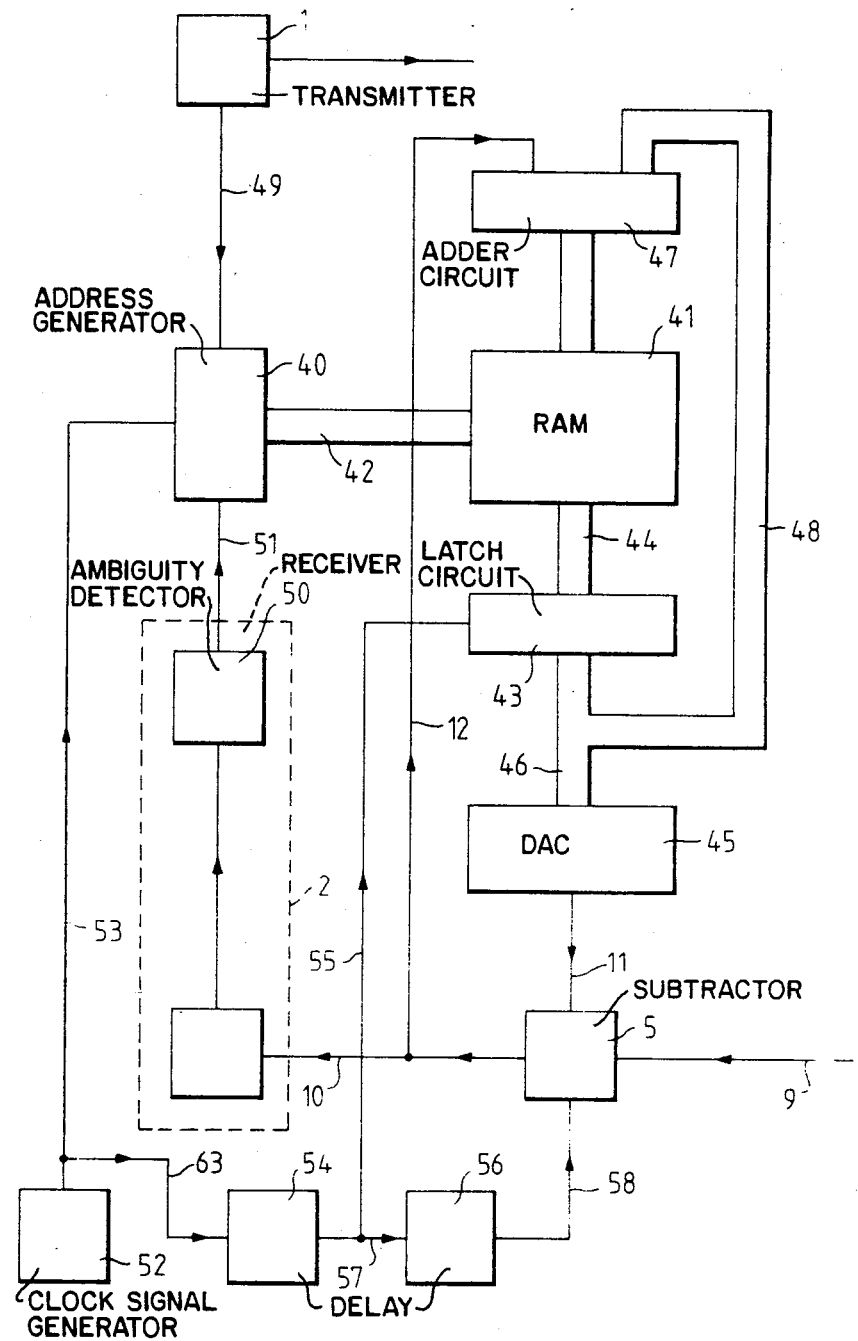
FIG. 4 shows an embodiment of an echo canceller suitable for use in the transmitter/receiver shown in FIG. 1 and its connection to the transmitter and receiver.

As shown in FIG. 4 the data to be transmitted by the transmitter 1 is fed also to an address generator 40 which applies address codes to the address inputs of a Random Access Memory (RAM) 41 via a highway 42. The data outputs of the RAM 41 are connected to inputs of a latch circuit 43 via a highway 44, the outputs of the latch circuit 43 being applied to the inputs of a digital to analog converter (DAC) 45 via a highway 46 and to a first set of inputs of an adder circuit 47 via a highway 48. The output of the DAC 45 is fed via the line 11 to the second input of the subtractor 5 while the received signal is fed via the line 9 to the first input of the subtractor 5. The output of the subtractor 5 is fed via the line 10 to the receiver 2 and via the line 12 to a second set of inputs of the adder circuit 47. The receiver 2 includes an ambiguity detector 50 which produces an output on line 51 which indicates the time during which the true eye is present, this indication being applied to the address generator 40. The output of a clock signal generator 52 is connected to the address generator 40 via a line 53 and to a delay circuit 54 via a line 63. The output of the delay circuit 54 is connected to a clock input of the latch circuit 43 via a line 55 and to the input of a further delay circuit 56 via a line 57. The output of the delay circuit 56 is connected to a further input of the subtractor 5 via a line 58.

The principle of operation of the look-up-table type adaptive echo-canceller shown in FIG. 4 is basically to store digital replicas of all possible echoes and to use these when required to nullify the echoes. As the received echoes are correlated to the transmitted data, the transmitted data can be used to form an address which points to the appropriate memory location where an echo-replica of the particular bit sequence transmitted is stored. The content of the RAM 41 is converted by the digital to analog converter (DAC) 45 to an analog voltage before being subtracted in the subtractor 5 from the received signal. The adder circuit 47 gives the system a self-adjusting capability using the output of the subtractor as a control signal to update the memory content so as to minimize the difference between the replica and the actual echo.

As shown in FIG. 4 the input signal to the address generator 40 is the original input data sequence of the transmitter 1. This considerably simplifies the address logic which would otherwise have to undo at least some of the processing done by the transmitter. However, since the transmitter now forms part of the echo path, good performance can only be expected if the transmitter is linear. If it includes some non-linear operations, such as scrambling, then to obtain the best performance, it must be divided into a non-linear and a linear portion, and the input to the address generator 40 taken from the output of the non-linear portion.

The maximum echo length with which the canceller can cope is determined by the width of the address. It has been found that for a bit rate of 96 kbit/s an echo length of 30 μs is normally sufficient to account for line delay. The increase caused by the transmitter, the hybrid and any filters that may be necessary between the hybrid coupler and the subtractor is uncertain since it depends on the design of these networks. For every 10.4 μs increase in echo length the address width must be increased by one bit (thus doubling the memory size). If the maximum echo length is not taken into consideration not only will these echoes not be fully cancelled but also the accuracy of the echo replicas will be effected. For the currently considered case, if an increase of about 10 μs is assumed the address width will be 4 bits. This latter figure must be increased by $\log_2 R$, if the received signal is sampled R times in each data bit interval. For WAL 2 code, for example, the Nyquist sampling rate is four times the bit frequency so that the total address width in this case will be 6 bits.

A number of algorithms for minimizing the mean square error are available, examples of which have been discussed for example in a paper by N. A. M. Verhoeckx, H. C. van den Elzen, F. A. M. Snijders, and P. J. van Gerwen published in IEEE transactions on Acoustics, Speech, and Signal Processing, Volume ASSP-27, No. 6, December 1979 at pages 768 to 781 and entitled "Digital Echo Cancellation for Baseband Data Transmission", the contents of which are incorporated herein by reference. In choosing the right algorithm a compromise has to be made between convergence time and the attainable minimum mean square error on one hand and hardware complexity on the other. In the adaptive echo-canceller shown in FIG. 4 the simplest algorithm, known as the sign algorithm, has been chosen. Thus only the sign of the subtractor output is used in the adaption process; one bit being added to or subtracted from the relevant memory location depending on whether the sign is positive or negative.

At the start of adaption this may mean a slow convergence process. However, once convergence has been achieved the echo-replica will not wander by more than a few DAC steps from the echo value. In the absence of far-end transmission convergence will be to ±1 step of echo level. In the presence of far-end transmission, convergence occurs as before to the point when the residual echo at the output of the subtractor becomes just smaller than the wanted signal.

The sign of the control signal is then determined by the wanted signal so that no further information on the echo component can be extracted. In this case, therefore, the system converges to give a wanted signal to residual echo ratio of 0 dB. The solution to this problem is not to have a fixed threshold comparator to determine the sign of the control signal but to shift the threshold randomly between the peak-to-peak wanted signal level. This "dither effect" enables the echo to be suppressed to a level well below the wanted signal.

The word length of the digital to analog converter depends on two main factors: the acceptable residual-echo level in relation to the wanted signal and the maximum echo suppression required. If an echo-suppression ratio of Y is required and a residual-echo level of $mV_s$ (peak) is acceptable, $V_s$ being the DAC step sizes, then the word length W is given by:

$$Y = \frac{2^W}{2m} \text{ or}$$

$$W = \log_2 2mY$$

The residual-echo distribution for the sign algorithm is binominal and given by:

$$P_m = {}_{2a}C_{a+m} \frac{1}{2^{2a}} \quad (m = 0, \pm 1, \pm 2, \ldots \pm a)$$

where $a = \frac{V_T}{V_s}$ $V_T$ being the peak value of the signal used for threshold dithering. If residual-echo levels above $n\sigma V_s$ ($\sigma$ being the standard deviation of the residual-echo distribution and n a positive integer) can be ignored on the grounds that the probability of their occurring is small (e.g. p ($|m|<4\sigma$)≈1×10⁻⁶), then $$W = \log_2 2n\sigma Y$$

Thus, if the smallest wanted signal S(k) is 30 $V_s$ then for residual-echo within four standard deviations an echo suppression of about 42 dB for 12 bit DAC, or 54 dB for 14 bit DAC can be achieved assuming that using automatic gain control.

$$V_T = S(k) + \sigma V_s$$

The memory word length is, of course, the same as the DAC word length. Hence if a 12 bit DAC is considered sufficient then the required RAM size is 64 words of 12 bits.

For 96 kbit/s WAL 2 coded data a clock frequency of 384 kHz is needed. This may be the same as the transmitter clock. A major factor in the timing of the various circuits is the propagation delay around the closed feedback loop. If the circuits in the loop are fast enough to give a propagation delay of less than one clock period (2.6 μs), then the reading and updating of a given memory location can be performed in the same clock period while the same address is being held. using a fast bipolar RAM, a DAC with a conversion time of about 1 μs, fast settling operational amplifiers and low-power Schottky TTL logic circuits a loop delay of less than 2 μs is possible. Thus a given memory location can be read and updated within one clock period. This makes the timing of the various circuits far easier than would otherwise be the case.

If a higher bit rate is used then it may not be possible to read and update a given memory location within one clock period. In this case, a bidirectional parallel-in parallel-out shift register can be used so that after reading data from one memory location the preceding location can be addressed and updated. As the clock period decreases the address width may also have to be increased.

Figure 2:
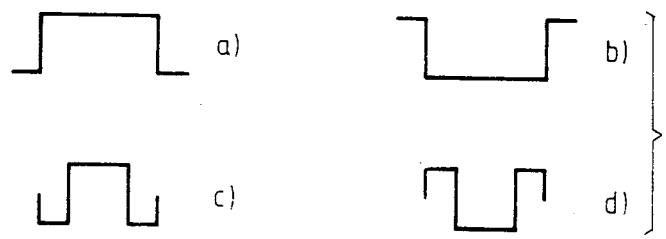
FIG. 2 illustrates the WAL2 codes corresponding to a binary one and binary zero.
Figure 3:
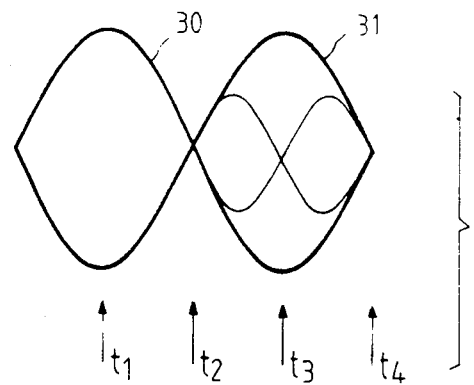
FIG. 3 shows an eye diagram produced from a received signal encoded according to the WAL2 code.

FIG. 2 illustrates the form of the WAL 2 transmission code FIG. 2c showing the WAL 2 equivalent of a logical '1' (FIG. 2a) and FIG. 2d showing the WAL 2 equivalent of a logical '0' (FIG. 2b). FIG. 3 shows an eye diagram produced by an input signal encoded according to the WAL 2 code, the diagram having a true eye 30 and a false eye 31. Data is valid during the true eye and invalid during the false eye. By sampling the signal during the true eye, preferably at the time $t_1$ which gives the maximum amplitude signal, the occurrence of a logical '1' or logical '0' in the original signal transmitted can be detected. Sampling during the false eye 31 will not enable the original data to be decoded. It has now been recognized that it is unnecessary to cancel echoes occurring during the time corresponding to the false eye such as those occurring at the instant $t_3$ since there is no information content in the signal at that time and, at least in theory, it is not necessary to cancel errors at the instants $t_2$ and $t_4$ of the zero crossings of the signal. This gives the advantage that the amount of storage required in a look-up table type echo canceller can be reduced by 75% while the operational speed of transversal filter type echo canceller may be similarly reduced. In practice it may be necessary to derive clocking information from zero crossing instants in which case echo cancellation would be needed at either the instant $t_2$ or the instant $t_4$.

The memory size may be reduced or the echo-length capability increased by making use of the fact that only the true eye is needed to decode the transmitted message. The clock recovery circuit in the receiver uses the true eye and the zero crossing succeeding it. Consequently echo-cancellation is not really necessary at the other two instants. Thus the memory size can be halved. The ambiguity as to which two of the four instants are needed can be resolved at the expense of convergence time. Alternatively, the memory size can be left unchanged, the echo-canceller started as it is and after convergence the address line corresponding to the unwanted instants switched to accept one more data bit so that the canceller effectively becomes a five bit canceller.

Figure 5:
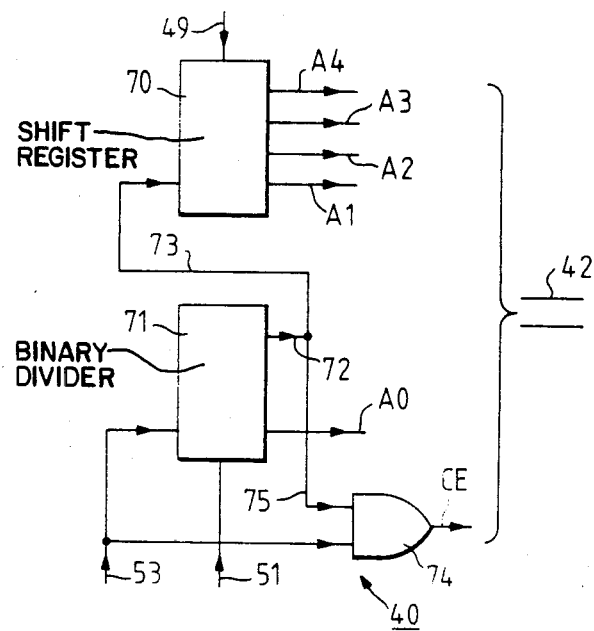
FIG. 5 shows an embodiment of an address generator for use in the echo canceller shown in FIG. 4.
Figure 6:
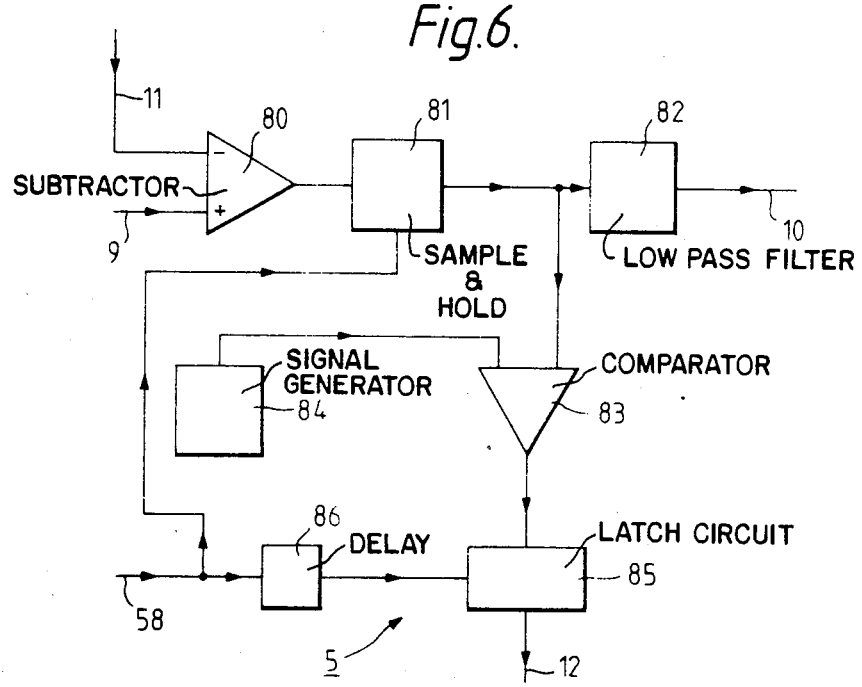
FIG. 6 shows an embodiment of a subtractor for use in the echo canceller of FIG. 4.

FIGS. 5 and 6 show in greater detail the address generator 40 and the subtractor 5 respectively, shown in FIG. 4. The address generator 40 comprises a 4 bit shift register 70 to which the transmitted binary data is applied serially via the line 49. The shift register has four parallel outputs on lines A1 to A4 which are equivalent to the last four binary digits transmitted. Since we are assuming that the data is encoded to form the WAL 2 transmission code it is necessary to sample the received signal at four times the transmitted bit rate. It is also necessary to produce echo replicas at that rate if the received signal is to be corrected at each sampling input. In prior art echo cancellers therefore two further address lines have been provided which are driven by the clock generator 52 to give the four sampling periods per bit period. However in the present echo canceller, since we now only wish to correct the received signal during the true eye, only one further address line A0 is provided. This is generated from the clock signal on line 53 by means of a binary divider 71 the output A0 being at half the clock frequency. A further output 72 of the divider 71 which is at a quarter of the clock frequency and hence at the binary data rate is fed to the clock input of the shift register 71 via a line 73 and via a line 75 to a first input of an AND gate 74, a second input of which is connected to the clock signal on line 53. The lines A0 to A4 and a line CE from the output of the AND gate 74 form the highway 42 which is connected to the RAM 41, the signals on the lines A0 to A4 forming the address for the RAM 41 and the signal on line CE being a chip enable signal so that the address to the RAM 41 is only effective when both the clock signal on line 53 and the quarter frequency clock signal on line 75 are present, i.e. twice in every bit period. Thus the RAM 41 is enabled at the instants $t_1$ and $t_2$ (FIG. 3) so that the echo canceller is effective at the sampling instant $t_1$ which corresponds to the centre of the true eye and at the instant $t_2$ which corresponds to the subsequent zero crossing.

As shown in FIG. 6 the subtractor 5 comprises a subtractor 80, a sample and hold circuit 81, a low pass filter 82, a comparator 83, a signal generator 84, a latch circuit 85, and a delay circuit 86. The received signal on line 9 and the echo replica on line 11 are connected to first and second inputs of the subtractor 80 which produces at its output a signal proportional to the difference between the received signal and the echo replica. The output of the subtractor 80 is fed to the sample and hold circuit which under the control of the clock signal on line 58 samples the output of the subtractor 80 and applies the sampled signal to the input of the low pass filter 82 and to a first input of the comparator 83. The output of the low pass filter 82 is fed via line 10 to the receiver 2. The signal generator 84 produces a signal having a triangular waveform having a frequency of approximately 13 kHz and an amplitude approximately equal to the peak to peak amplitude of the wanted input signal. The signal produced by the signal generator 84 is applied to a second input of the comparator 83. The output of the comparator 83 is connected to a latch circuit 85 into which it is clocked by the clock on line 58 delayed by a time which is determined by the delay circuit 86. The output of the latch 85 is fed via the line 12 to the adder 47.

The echo canceller shown in FIGS. 4, 5 and 6 operates as follows. Data to be transmitted by the transmitter 1 is fed also to the address generator 40 and causes a word in the RAM 41 to be addressed, the word addressed being dependent on the sequence of data bits to be transmitted, in this case the last four bits. These bits are read in serially to the shift register 70 and are read out in parallel on lines A1 to A4. The fifth bit of the address is available on line A0 from the frequency divider 71. The RAM 41 is enabled by the signal on line CE which occurs at the instants $t_1$ and $t_2$ and is generated by the combination of the clock signal on line 53 and a signal on line 75 at one quarter of the clock frequency. The true eye detector 50 produces an output on line 51 which resets the frequency divider 71 to a given state when the true eye is detected to ensure that the RAM 41 is enabled at times $t_1$ and $t_2$ rather than times $t_3$ and $t_4$. The output of the RAM 41 is passed via the highway 42 to the latch circuit 43 where it is captured under the control of the clock signal on line 55. The output of the latch circuit 43 is passed via the highway 46 to the DAC 45 where it is converted to an analog signal for application via the line 11 to the subtractor 5. The output of the latch 43 is also passed via the highway 48 to the first set of inputs of the adder circuit 47. The echo replica, which is the signal on line 11 from the DAC 45 is subtracted in the subtractor 80 from the received signal on line 9. The output of the subtractor 80 is fed to the sample and hold circuit 81 which operates under the control of the clock signal on line 58. The output of the sample and hold circuit 81 is fed via the low pass filter 82 and the line 10 to the receiver 2 and to one input of the comparator 83. The output of the signal generator 84 is connected to the other input of the comparator 83 and the state of the output of the comparator 83 is captured by the latch 85 at a time determined by the clock signal on line 58 delayed by the delay circuit 86. The output of the latch 85 is fed via the line 12 to the second set of inputs of the adder circuit 47 and causes adder to produce an output which is equal to the number on the first set of inputs increased or decreased by one depending on whether the output of the sample and hold circuit 81 is greater than or less than the output of the signal generator 84 at the instant the output of the comparator 83 is clocked into the latch 85.

The timing of the various operations described is as follows. At the start of a clock cycle the RAM 41 is addressed and the output is latched after a first delay period which allows the addressed data to appear on the highway 44. After a second delay period the output of the subtractor 80 is captured by the sample and hold circuit 81 this delay being sufficient to allow the DAC 45 to convert the digital echo replica from the output of the latch 43 into an analog signal and to allow the subtractor 80 to settle. After a third delay to allow the comparator 83 to compare the outputs of the sample and hold circuit 81 and the signal generator 84 the output of the comparator 83 is captured by the latch 85. The adder circuit 47 then produces an output which is equal to the data on its first set of inputs incremented or decremented by one which is then read into the RAM 41. This last operation is preferably completed during the address period i.e. between the instants $t_1$ and $t_2$ in order to simplify the addressing of the RAM 41.

Various modifications may be made to the echo canceller shown in FIG. 4 without departing from the scope of the invention. For example, other adaption algorithms may be used some of which are shown in the paper by N. A. M. Verhoeckx and others referred to hereinbefore. Also, as discussed in that paper, the echo canceller may be arranged for digital subtraction or sampled data subtraction as alternatives to the analog subtraction shown.

Although the embodiment of the invention has been described with reference to a look-up table type echo canceller it is also applicable to transversal filter type echo cancellers. However, in order to reduce the processing speed requirements when correcting errors at successive sampling instants such as $t_1$ and $t_2$ it is necessary to store the subtractor output before application to the adaption means so that each correction may take place over half the bit period.

I claim:

1. A digital duplex communication system for data signals having a power-versus-frequency spectrum comprising two sidebands located one each side of a symbol frequency, the system comprising a transmitter/receiver including an echo canceller, the received signal being sampled a plurality of times in each period of the symbol frequency (symbol period) and comprising in each symbol period a first time during which data is valid and a second time during which data is invalid, the data being decoded from the value of the sampled signal during the first time characterized in that the echo canceller is inoperative when the received signal is sampled during the second time.

2. A system as claimed in claim 1, in which the received signal is sampled four times in each symbol period, the third time corresponding to a zero crossing of the signal between the first and second times and the fourth time corresponding to a zero crossing of the signal between the second time of one symbol period and the first time of the succeeding symbol period, characterized in that the echo canceller is inoperative at the second and fourth times.

3. A system as claimed in claims 1 or 2, in which the echo canceller is of the look-up table type.

4. A system as claimed in claim 3, in which the memory contents at the addressed portion of the look-up table is incremented or decremented by one depending on the sign of the echo remaining after cancellation.

* * * * *